United States Patent [19]

Fullenbach et al.

[11] 3,953,240

[45] Apr. 27, 1976

[54] SEALING ELEMENT FOR ELECTRIC PRIMARY CELLS HAVING STEEL CASINGS

[75] Inventors: Hermann Füllenbach; Friedrich Christof; Alois Fränzl, all of Ellwangen, Jagst, Germany

[73] Assignee: Varta Batterie AG, Kelkheim, Taunus, Germany

[22] Filed: July 9, 1973

[21] Appl. No.: 377,709

[30] Foreign Application Priority Data

July 29, 1972 Germany............................ 2237398

[52] U.S. Cl................................. 136/107; 136/133; 136/169
[51] Int. Cl.². ........................................ H01M 1/02
[58] Field of Search................... 136/107, 131–133, 136/163, 167, 169, 178, 128

[56] References Cited
UNITED STATES PATENTS

| | | |
|---|---|---|
| 2,822,416 | 2/1958 | Parkinson............................ 136/107 |
| 2,849,521 | 8/1958 | Heise et al............................ 136/133 |
| 3,223,555 | 12/1965 | Solomon et al....................... 136/14 |
| 3,278,340 | 10/1966 | Bell...................................... 136/178 |
| 3,484,301 | 12/1969 | Gray.................................. 136/133 X |
| 3,753,781 | 8/1973 | Parker et al......................... 136/107 |

*Primary Examiner*—Anthony Skapars
*Attorney, Agent, or Firm*—Herbert L. Lerner

[57] ABSTRACT

An electric primary cell having a metal casing includes a cup electrode disposed in the metal casing and a cardboard sleeve in the metal casing between the latter and the cup electrode. The metal casing has an inwardly flanged upper edge and a cover disc having an outer edge is disposed on the metal casing. A resilient plastic material is disposed between the flanged upper edge of the metal casing, the sleeve, and the outer edge of the cover disc.

3 Claims, 6 Drawing Figures

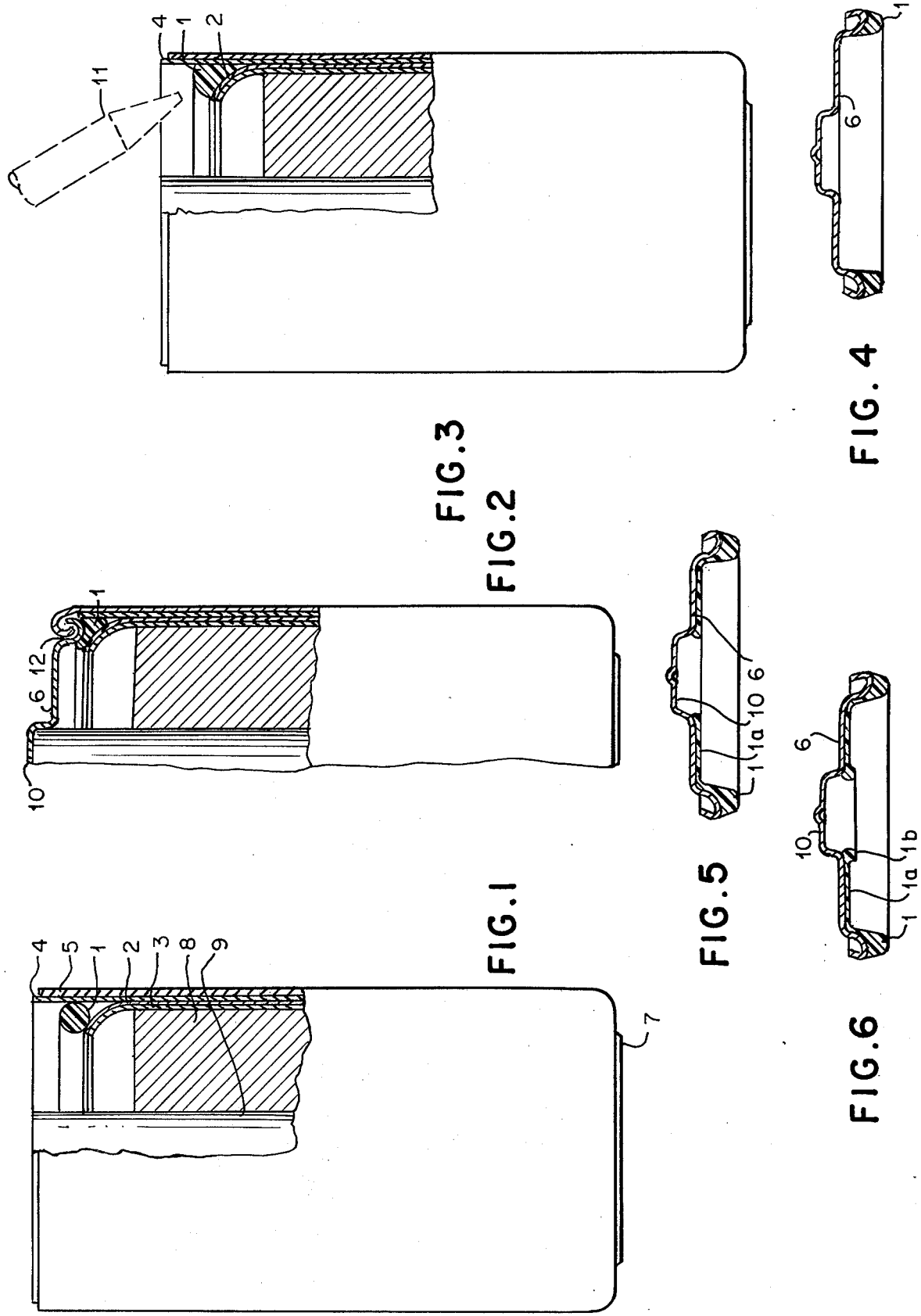

SEALING ELEMENT FOR ELECTRIC PRIMARY CELLS HAVING STEEL CASINGS

This invention relates to a sealing element for an electric primary cell having a steel casing and more particularly to a sealing element of resilient material which is disposed in the primary cell between the flanged upper end of a cup electrode, a cardboard sleeve, and the outer edge of an upper cover disc.

Known electric primary cells of the type utilizing a paste or paper lining construction are usually sealed on the side of the positive terminal according to two principal methods. In one method an electrically insulating seal of a thermally liquifiable material, preferably bitumen, a bitumen-wax mixture, or wax, is disposed above an upper cover disc between a carbon rod and a cup electrode. In the other known method an electrically insulating molding made of thermoplastic material is secured with a close fit between a carbon rod and a cup electrode above an upper sealing disc by bearing against a bead and rolling in the upper edge of the cup electrode.

These known seals have the disadvantage that a substantial part of the upper region of the cup electrode is lost or is not usable for the current-generating reaction. Also in using these known sealing arrangements, gas pressure, which may be produced in the primary cell under certain conditions, cannot be reduced or relieved without damage to the cell because the path which the gas takes in escaping from the cell is not reclosable and therefore, there exists the danger of drying out of the cell.

Accordingly, an object of the present invention is to eliminate the aforementioned disadvantages in cells of the type which have a steel casing as additional outer protection by providing a sealing element consisting of a resilient plastic material which is situated in the primary cell between an upper edge of a cup electrode, which is rolled over inwardly, a cardboard sleeve, and an outer edge of an upper cover disc.

The advantages to be achieved thereby is found in the fact that due to the design according to the present invention, the usable inside space of the electric primary cell is increased by the height of known sealing systems customarily used heretofore so that the possibility thereby exists that the cells may be provided with more head room or filled in with more electrochemically active material to provide an increase in capacity.

In addition to the above advantage, the primary cell according to the present invention possesses a resilient edge valve provided through the cooperation of the elastic sealing element with the rolled-over resilient edge of the steel casing which functions to harmlessly decrease high gas pressure arising in the interior of the cell.

The principles of the present invention may be realized in several embodiments.

For example, the sealing element may be a self-contained ring having a shape conforming to the upper edge of the primary cell. This sealing element ring may be placed on the edge of a cup electrode which is rolled over at the top or on the edge of a prism-shaped electrode which is already inserted into the steel casing. Thereafter, the upper cover disc is put in place and subsequently, the cell is resiliently closed by rolling the edge of the steel casing over the cover disc which has an outer edge which is slotted accordingly.

According to a further embodiment of the present invention, the sealing element is not put in place as a self-contained ring on the flanged-over edge of the cup, but rather, the sealing element material is sprayed, squeezed, or otherwise dispensed or applied directly into a wedge or gap which exists between the edge of the cup and the outer casing, and the sealing element material is subsequently cured. The closing operation proper is initiated by positioning the cover disc in place on the cell.

Another practical application of the present invention consists of applying the sealing element prior to the assembly of the primary cell by spraying the sealing element material onto the lower outside edge of the upper cover disc. This operation may be performed in parallel or simultaneously with the remainder of the fabrication.

In certain primary cell types, the danger exists that the side of the upper cover disc which faces the interior of the cell may corrode. This may be prevented by the choice of a suitable metallic material for the cover disc. A simpler and less expensive arrangement, however, is to apply the material, from which the sealing element is made, not only as a circular bead to the under side of the cover disc, but in addition, to apply such material to the area of the cover disc which extends inwardly, with the exception of the terminal cap which accommodates the current take-off element of the positive electrode, and to utilize such applied material in this manner as a protection against corrosion.

In order to improve the seal against the terminal cap, it is further advantageous that the coating on the cover disc be also provided with a bead or sealing projection enclosing the terminal cap at its lower edge.

Other features which are considered as characteristic for the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is an elevational view, partly broken away and in cross section, of an electric primary cell before the cell has been closed.

FIG. 2 is a view similar to FIG. 1 showing the electic primary cell after the latter has been closed.

FIG. 3 is an elevational view, partly broken away and in cross section, of an alternate embodiment of an electric primary cell before the cell has been closed.

FIG. 4 is an elevational view of a cover disc having a sealing element on the underside of the outer edge.

FIG. 5 is a view similar to FIG. 4 but having a coating on the underside of the cover disc.

FIG. 6 is a view similar to FIG. 5 but having a projection on the underside of the cover disc adjacent the terminal cap.

Referring to the drawings, FIG. 1 shows a partial cross section through an electric primary cell before the latter has been closed. The sealing element 1 according to the present invention, is in a form conforming to the upper closing edge of the cell, and may be, for example, a circular ring or a rectangular gasket made of an elastic material. The sealing element 1 is inserted between a rolled-over edge of a cup electrode 2 and its outer enclosure which consists of a cardboard sleeve 4 and a steel casing 5. By way of example the cup electrode 2 may be made of zinc. A separator or paper lining 3 separates the cup electrode 2 from a depolarizer substance 8 which surrounds a current take-off element 9, the latter usually consisting of a carbon rod. A bottom disc designated 7 is also shown in the drawings.

FIG. 2 shows a partial cross section of the primary cell after closing. To effect closing, an upper cover disc 6 having a terminal cap 10 is placed on the current take-off element 9 and subsequently, the enclosure consisting of the cardboard sleeve 4 and the steel casing 5 are folded into a groove 12 in the cover disc 6. Due to the resilient pressure of the rolled-over steel casing 5, the sufficiently elastic sealing element 1 lying on the edge of the cup electrode 2 is deformed in such a manner that through contact over a circular area, an excellent seal with respect to the escape of gas or electrolyte is obtained.

If the internal pressure within the cell becomes excessively high due to unintentionally occurring gas development within the cell, this internal pressure conteracts the spring or resilient tension of the rolled over flange of the steel casing 5 and lifts the cover disc 6 slightly off the sealing surface on the cup electrode 2. The gas under pressure can then escape to the outside between the cup electrode 2 and the sealing element 1. Subsequently after the internal pressure is thus relieved, the system closes again through the elastic springback of the rolled over flange of the steel casing 5.

In a further embodiment according to FIG. 3, the sealing element 1 is disposed in the cell not as a loosely inserted ring which is secured only by pressure, but rather, the sealing element 1 is formed by spraying or dispensing the material forming the sealing element 1 into the ring gap between the inward-flanged cup electrode 2 and the pushed-on cardboard sleeve 4. The sealing element 1 may be placed in the gap by dispensing the sealing material from a tube 11 before closing. The cover disc 6 is placed on the sealing bead which is dispensed from the tube 11 and pressed down on the bead by the resilient action of the rolled over flange of the steel casing. If an elevated internal pressure occurs through gas development, the arrangement in the embodiment of FIG. 3 functions similarly to previously described embodiment in FIGS. 1 and 2, that is, the compressed gas is allowed to escape until the tension resulting from the elastic springback of the rolled over flange of the steel casing 5 exceeds the magnitude of the internal gas pressure.

In assembling the electric primary cells, an entire operational cycle can be saved if the sealing element 1 is formed on the cover disc 6 which, in one embodiment according to the invention, also serves at the same time as the closing cap, which would otherwise be required in addition. For an explanation of this practical embodiment, reference is made to FIGS. 4 to 6.

In FIG. 4 the sealing element 1 is located as a bead on the lower outside or underside of the cover disc 6. The sealing element 1 is placed on the cup electrode 2 before the cardboard sleeve 4 and steel casing 5 are flanged over.

In addition to applying the sealing material to the sealing surface proper, such sealing material may also be applied with sufficient thickness to the inside surface 1a of the cover disc 6 between the sealing surface and the terminal cap 10 as shown in FIG. 5. In such a case a sealing material is selected having properties which not only provides an electrically insulating effect but which in addition, protect the inside surface 1a of the cover disc 6 against corrosive attack by the electrolyte or by gases or vapors developed in the interior of the cell.

It is important to protect the interior of the terminal cap 10 against corrosion as otherwise the flow of current would be considerably impeded. Accordingly, as in FIG. 6, the sealing material may therefore extend, as indicated at 1a, on the inside surface of the cover 6 from the sealing bead proper, as indicated at 1 in FIG. 6, to the edge of the terminal cap 10. However, the edge of the sealing material at the terminal cap 10 may be formed as a bead or sealing projection 1b which, due to its elastic properties, engages the current take-off element 9 tightly below the terminal cap 10 and thereby effectively prevents corrosion of an unprotected, electrically conducting connection which would otherwise occur without such a sealing arrangement.

An example of a material which may be used for the sealing element 1 is rubber in muxture with synthetic material.

We claim:

1. An electric primary cell comprising a steel casing, a cup electrode having an inwardly flanged upper rim disposed in said steel casing, a cardboard sleeve in said steel casing between the latter and said cup electrode, said steel casing having an inwardly flanged upper edge, a cover disc having an outer edge extending beneath the inwardly flanged upper edge of said steel casing, and a sealant of resilient plastic material between said inwardly flanged upper rim of said cup electrode and said outer edge of said cover disc, said sealant being undetachably connected by dispensing on the underside surface of said outer edge of said cover disc.

2. An electric primary cell according to claim 1 wherein said cover disc is provided with a terminal cap, and a coating of said resilient plastic material is applied to the underside of said cover disc between said terminal cap and said outer edge of said cover disc.

3. An electric primary cell according to claim 2 where the lower edge of said terminal cap is provided with a projection formed with said resilient plastic material.

* * * * *